United States Patent
Doddaiah et al.

(10) Patent No.: US 11,954,079 B2
(45) Date of Patent: Apr. 9, 2024

(54) INLINE DEDUPLICATION FOR CKD USING HASH TABLE FOR CKD TRACK META DATA

(71) Applicant: Dell Products L.P., Hopkinton, MA (US)

(72) Inventors: Ramesh Doddaiah, Westborough, MA (US); Richard Goodwill, North Grafton, MA (US); Jeremy O'Hare, Westborough, MA (US); Michael Scharland, Franklin, MA (US); Mohammed Asher, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 58 days.

(21) Appl. No.: 17/840,671

(22) Filed: Jun. 15, 2022

(65) Prior Publication Data
US 2023/0409544 A1 Dec. 21, 2023

(51) Int. Cl.
G06F 16/00 (2019.01)
G06F 16/14 (2019.01)
G06F 16/215 (2019.01)
G06F 16/22 (2019.01)
G06F 16/174 (2019.01)

(52) U.S. Cl.
CPC ........... *G06F 16/215* (2019.01); *G06F 16/14* (2019.01); *G06F 16/2255* (2019.01); *G06F 16/1744* (2019.01)

(58) Field of Classification Search
CPC .... G06F 16/14; G06F 16/1744; G06F 16/215; G06F 16/2255
See application file for complete search history.

(56) References Cited

U.S. PATENT DOCUMENTS

| | | |
|---|---|---|
| 2016/0077745 A1* | 3/2016 | Patel ................... G06F 12/0253 714/704 |
| 2019/0278849 A1* | 9/2019 | Chandramouli ........ G06F 9/526 |
| 2019/0391912 A1* | 12/2019 | Meiri ..................... G06F 3/0644 |
| 2020/0026779 A1* | 1/2020 | Shveidel ............... G06F 3/0632 |
| 2020/0110905 A1* | 4/2020 | O'Cleirigh ............. G06F 21/51 |
| 2021/0124689 A1* | 4/2021 | Kucherov ........... G06F 12/0893 |

* cited by examiner

*Primary Examiner* — Diedra McQuitery
(74) *Attorney, Agent, or Firm* — Anderson Gorecki LLP

(57) ABSTRACT

The meta data containing count and key fields of CKD records are reversibly decoupled from the user data of the data field so that the data can be deduplicated. Multiple CKD records may be coalesced into a larger size CKD track. The coalesced meta data is compressed and stored in a CKD hash table. The user data is hashed, and the hash is used as a hash key that is associated with the compressed meta data in the CKD hash table. When the hash of user data associated with a CKD write IO matches the hash key of an existing entry in the table, data duplication is indicated. The compressed meta data is added to the entry and the user data is deduplicated by creating storage system meta data that points to the pre-existing copy of the user data. The storage system metadata includes unique information that enables the corresponding compressed metadata to be subsequently located in the hash table to reassemble the CKD records.

16 Claims, 8 Drawing Sheets

INLINE DEDUPLICATION FOR CKD USING HASH TABLE FOR CKD TRACK META DATA

TECHNICAL FIELD

The subject matter of this disclosure is generally related to deduplication of variable-length allocation units in electronic data storage systems.

BACKGROUND

High-capacity data storage systems such as storage area networks (SANs) are used to maintain large data sets that are contemporaneously accessed by multiple host servers. A SAN includes a network of interconnected compute nodes that manage access to data stored on arrays of drives. The compute nodes respond to input-output (IO) commands from host applications that run on the host servers. Examples of host applications may include, but are not limited to, software for email, accounting, manufacturing, inventory control, and a wide variety of other organizational processes. SANs are often based on a fixed block architecture (FBA) in which logical drives with same-size allocation units located at contiguous logical block addresses (LBAs) are presented to the hosts. However, SANs can be configured to store variable length allocation units such as count key data (CKD) records.

Data reduction is an important aspect of storage system management. Data reduction includes functions such as compression and deduplication that reduce storage requirements for a given data set. Compression algorithms encode data to reduce statistical redundancy in the data stored on the drives. Deduplication reduces or eliminates storage of duplicated allocation units by using pointers to map multiple LBAs to a single copy of a duplicated allocation unit. Variable length allocation units such as CKD records are ill-suited to deduplication because they include at least some information that is unique.

SUMMARY

The following summary is not intended to be comprehensive or otherwise limiting. Additional example, aspects, and features are included in the detailed description. All examples, aspects, and features mentioned in this document can be combined in any technically possible way.

An apparatus in accordance with some implementations comprises a data storage system comprising a plurality of non-volatile drives and at least one compute node configured, responsive to receipt of an input-output (IO) command to write a variable length allocation unit comprising meta data and user data, to store the meta data in a first data structure, store the user data in a second data structure, and deduplicate the second data structure.

A method in accordance with some implementations comprises a compute node of a data storage system receiving an input-output (IO) command to write a variable length allocation unit comprising meta data and user data; storing the meta data in a first data structure; storing the user data in a second data structure; and deduplicating the second data structure.

In accordance with some implementations a non-transitory computer-readable storage medium stores instructions that when executed by a computer cause the computer to perform a method for using a computer system to store data, the method comprising: receiving an input-output (IO) command to write a variable length allocation unit comprising meta data and user data; storing the meta data in a first data structure; storing the user data in a second data structure; and deduplicating the second data structure.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multipurpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
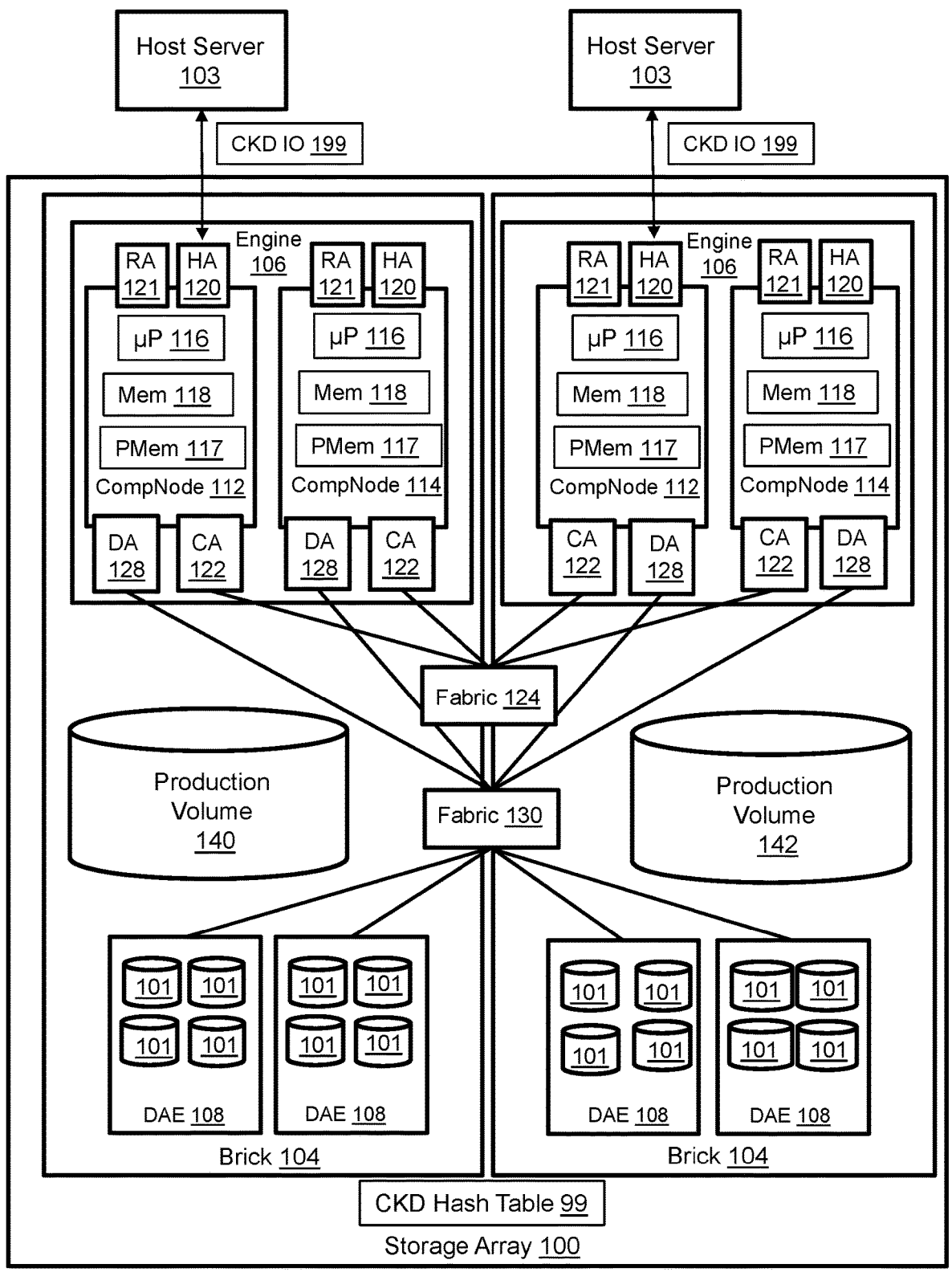
FIG. 1 illustrates a storage array configured with a CKD hash table for reversibly decoupling unique information from user data to enable deduplication of VBA allocation units user data.

FIG. 1 illustrates a storage array 100 configured with a CKD hash table 99 in non-transitory memory for reversibly decoupling unique information from user data to enable deduplication of user data of VBA allocation units such as CKD tracks. The storage array is depicted in a simplified data center environment supporting two host servers 103 that run host applications. The host servers may be implemented as individual physical computing devices, virtual machines running on the same hardware platform under control of a hypervisor, or in containers on the same hardware platform. The storage array 100 includes one or more bricks 104. Each brick includes an engine 106 and one or more drive array enclosures (DAEs) 108. Each engine 106 includes a pair of interconnected compute nodes 112, 114 that are arranged with mirrored data and metadata in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116, local volatile memory 118, and persistent memory 117. The processor 116 may include central processing units (CPUs), graphics processing units (GPUs), or both. The local volatile memory 118 may include volatile media such as dynamic random-access memory (DRAM). The persistent memory 117 may include non-volatile memory (NVM) such as storage class memory (SCM). Each compute node includes one or more host adapters (HAs) 120 for communicating with the host servers 103. Each host adapter has resources for servicing CKD input-output commands (IOs) 199 from the host servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 are non-volatile electronic data storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Data associated with instances of a host application running on the hosts 103 is maintained on the managed drives 101. The managed drives 101 are not discoverable by the hosts but the storage array creates logical storage objects referred to herein as production volumes 140, 142 that can be discovered and accessed by the hosts. Without limitation, a production volume may be referred to as a storage device, source device, production device, or production LUN, where the logical unit number (LUN) is a number used to identify logical storage volumes in accordance with the small computer system interface (SCSI) protocol. From the perspective of the hosts 103, a production volume is a single drive having a set of contiguous logical block addresses (LBAs) on which data used by the instances of the host application resides. However, the host application data is stored at non-contiguous addresses on various managed drives 101, e.g., at ranges of addresses distributed on multiple drives or multiple ranges of addresses on one drive.

Figure 2:
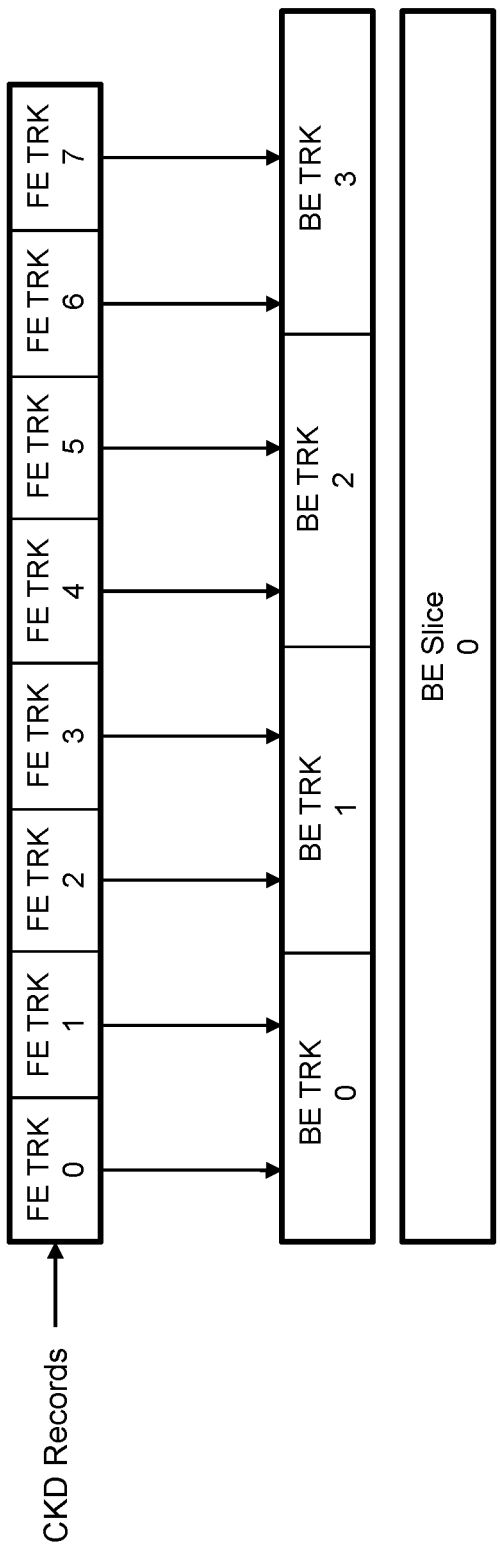
FIGS. 2 and 3 illustrate how CKD records, front-end tracks (FE TRKs), and back-end tracks (BE-TRKs) are managed and used for data access.

Referring to FIGS. 1 and 2, the basic allocation unit of storage capacity that is used by the compute nodes to access the managed drives 101 is a back-end track (BE TRK). The compute nodes do not access the managed drives using allocation units other than BE TRKs. BE TRKs may, but do not necessarily, all have the same fixed size which may be an integer multiple of the managed drive sector size. The managed drives 101 may each be organized into back-end (BE) slices of equal storage capacity, i.e., every BE slice has the same fixed size. Each BE slice may include multiple BE TRKs. Host application data is logically stored in front-end tracks (FE TRKs), that may be referred to as blocks, on the production volumes 140, 142, but physically stored on BE TRKs. The FE TRKs do not necessarily have a single fixed size. On a production volume with a fixed-block architecture (FBA) all the FBA FE TRKs may have the same size. On a production volume with a variable-block architecture (VBA) the FE TRKs exist in a variety of sizes. For example, FE TRKs used to store count key data (CKD) records can vary in length, up to a 56 KB limit. Thus, multiple 0-56 KB CKD FE TRKs can be placed in each 128 KB BE TRK of a BE slice.

BE TRKs and FE TRKs should not be confused with the "tracks" that are related to hard disk drive (HDD) architecture. An HDD track corresponds to a concentric band on a disk and a sector is a portion of one of those concentric bands, e.g., 1 track may have 32 sectors. BE TRKs are larger in size than HDD tracks, e.g., 128 KB rather than 512 bytes, and are not limited by the physical architecture of a spinning disk. The BE TRK size for a SAN is selected as a design choice and is generally proportional to the manageability of the metadata, but inversely proportional to resource utilization efficiency. Using larger capacity BE TRKs can reduce the resource burden on memory and processing resources for metadata management but decreases the efficiency of managed drive utilization by creating more unused space in BE TRKs. However, as the total storage capacity of drives and SANs increases due to technological advances there is a greater need to increase the BE TRK size and/or implement multiple BE TRK sizes to mitigate the metadata management burden on memory and processing resources.

Figure 3:
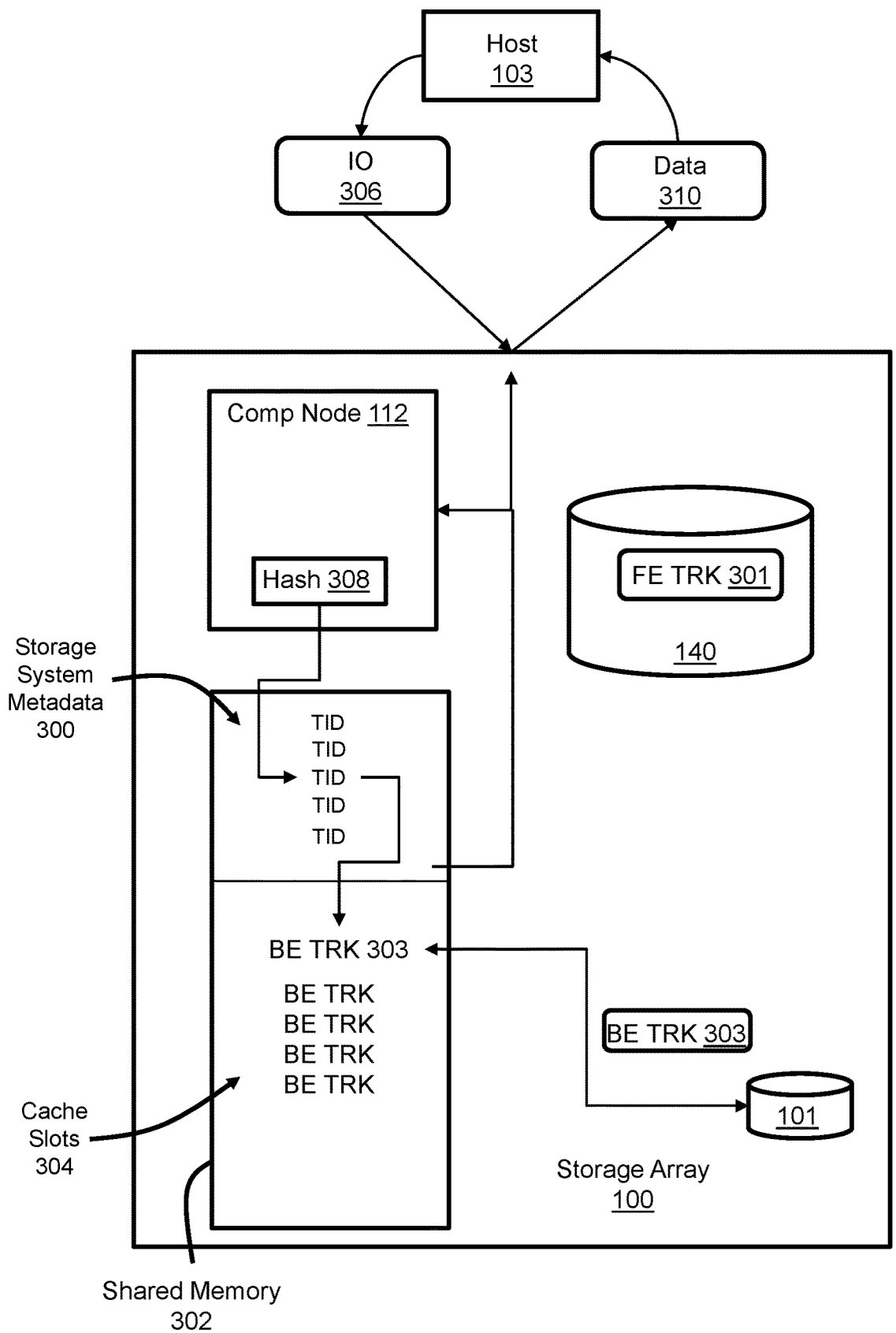

FIG. 3 illustrates how a FE TRK 301, BE TRK 303, and storage system metadata are used by the storage array 100 when servicing an IO command 306. Each compute node allocates a portion of its volatile memory to a shared "global" memory 302 that can be accessed by all compute nodes of the storage array via direct memory access (DMA). One of the compute nodes 112 receives the IO command 306 from one of the hosts 103. In the illustrated example the IO command is a Read or Write to a FE TRK 301 of production volume 140. Storage system metadata 300 is maintained in track identification tables (TIDs) that are located in an allocated portion of the shared memory 302. The TIDs include pointers to BE TRKs that contain host application data. BE TRKs are located on the managed drives 101 and are temporarily paged-in to a cache slots 304 portion of the shared memory 302 to service IOs. The compute node 112 identifies a TID corresponding to the IO command 306 and FE TRK 301 by inputting information such as the device number, cylinder number, head (track) and size obtained from the IO into a hash table 308. The hash table 308 indicates the location of the TID in the shared memory 302. The TID is used by the compute node 112 to find the corresponding host application data in the BE TRK 303 indicated by the TID. Specifically, the BE TRK 303 is accessed in the cache slots 304 of shared memory 302 if it is present in the shared memory. If the corresponding BE TRK 303 is not present in the shared memory 302, then the compute node 112 uses the TID to locate and copy the BE TRK 303 from the managed drives 101 into the shared memory 302 to service the IO. In the case of a FBA Read IO, the FE TRK data 310 specified by the IO 306 is obtained from the BE TRK 303 in the shared memory and a copy of the data is sent to the host 103. In the case of a FBA Write IO the FE TRK data is copied into the BE TRK in the shared memory and eventually destaged to the managed drives 101, e.g., overwriting the stale copy on the managed drives. The process differs somewhat for variable-length tracks. Referring to FIGS. 2 and 3, the storage array metadata in the TIDs maps CKD FE TRKs 0-7 to BE TRKs 0-3 but there may be only one TID per BE TRK in some implementations. Each CKD FE TRK maintains its own BCRC/CRC that can be used to help distinguish between CKD FE TRKs within a BE TRK. As will be explained below, deduplication requires further steps.

Figure 4:
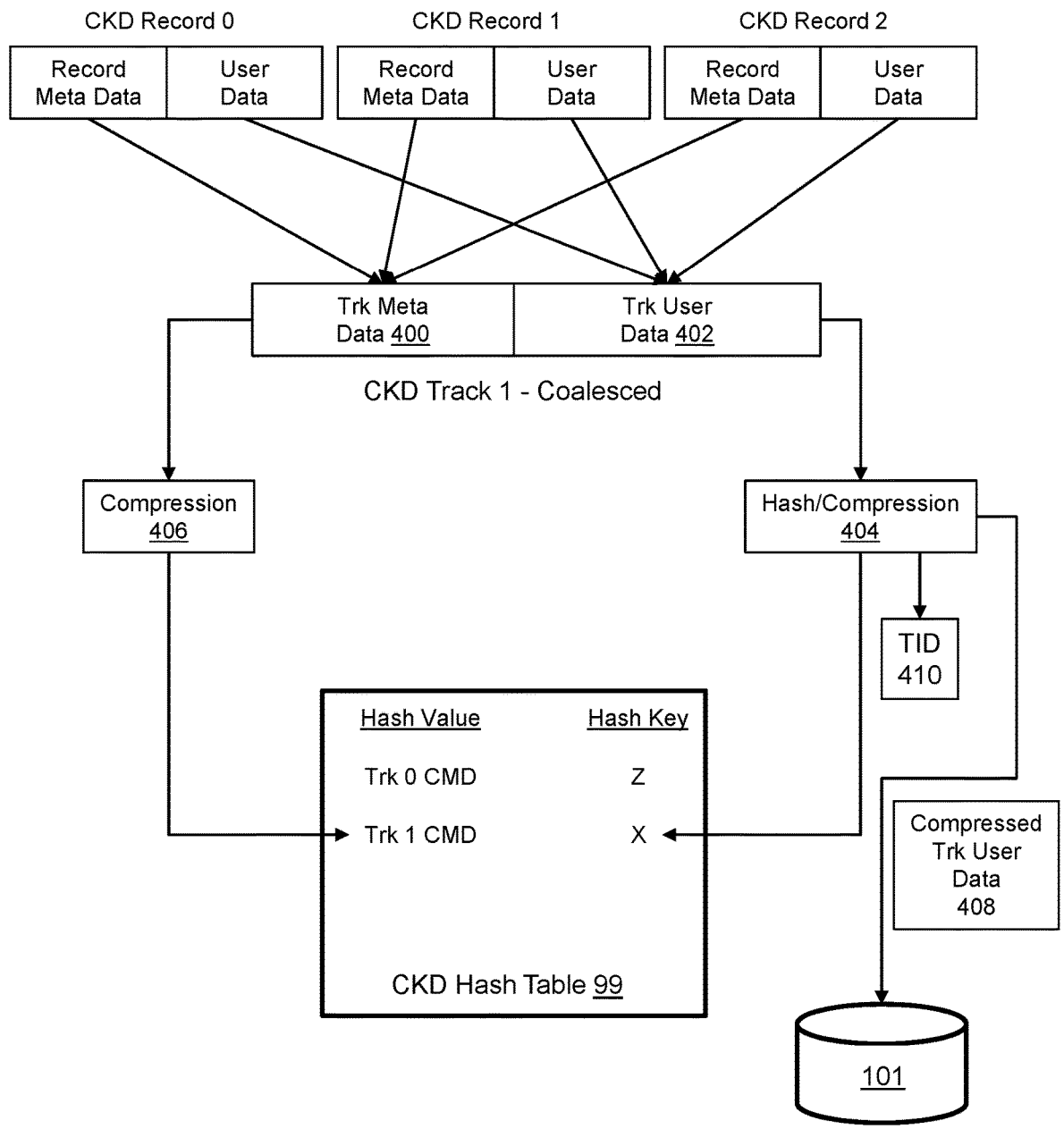
FIG. 4 illustrates reversibly decoupling unique information from user data by creating an entry in the CKD hash table.

FIG. 4 illustrates reversibly decoupling unique CKD meta data from user data by creating a new entry in the CKD hash table 99. A new entry is created in the CKD hash table when the user data of a CKD write IO is not a duplicate. Each CKD record includes user data and meta data. The meta data includes a count and an optional key. The count includes an indication of the length of the user data, unique information such as the cylinder and head, and optionally a timestamp. The unique information complicates deduplication. The CKD hash table 99 helps to enable deduplication of CKD records 0-2 by storing decoupled unique meta data and associating that decoupled unique meta data with a hash key associated with user data that can be deduplicated. In the illustrated example a host writes CKD records 0-2 to the storage array, e.g., to FE TRKs 0-2 of one of the production volumes. A coalesced CKD track 1 is generated from the CKD records 0-2. In particular, the meta data of CKD records 0-2 is combined by being appended to create track meta data 400 and the user data of CKD records 0-2 is appended to create track user data 402. The track user data 402 is provided to a hash/compression engine 404 that compresses and calculates a hash of the track user data. The hash may be calculated from either the uncompressed or compressed track user data. The hash is used as a hash key to index into the CKD hash table 99. The hash (X in the illustrated example) uniquely represents the hashed track user data 402 so a matching hash key entry in the CKD hash table 99 would indicate that the track user data is a duplicate of a previously stored BE TRK. The absence of a matching hash key entry X indicates that the track user data is not a duplicate, so a new entry is created in the CKD hash table 99 with the hash key X. The track meta data 400 is provided to a compression engine 406 and the compressed track meta data, Trk 1 CMD, is stored in the new entry, thereby associating Trk 1 CMD with the hash key X. The compressed track user data 408 is destaged to a BE TRK on the managed drives 101. Corresponding storage array metadata is also created, e.g., a TID 410 that maps the CKD FE TRKs to the BE TRK on the managed drives.

Figure 5:
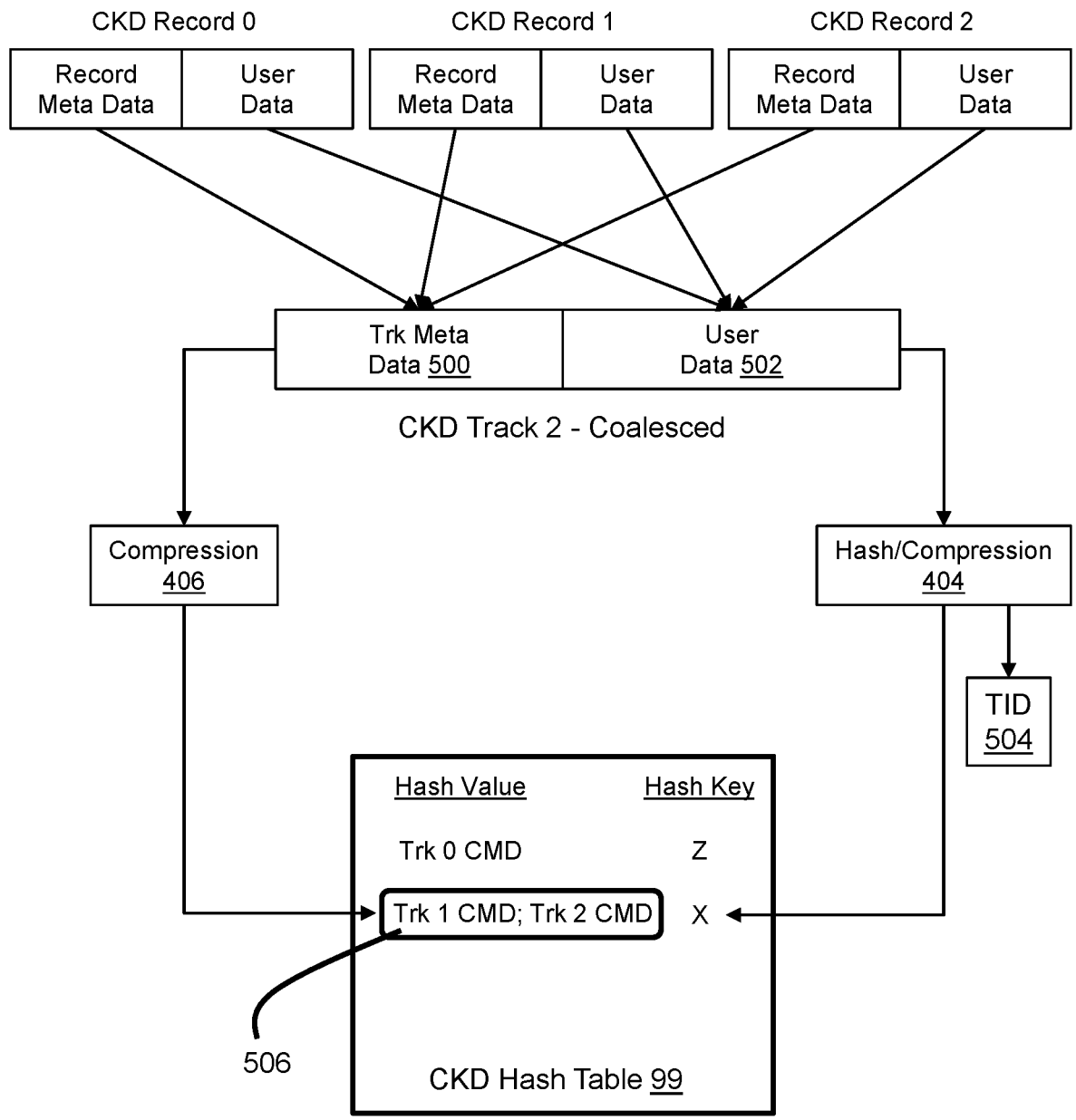
FIG. 5 illustrates reversibly decoupling unique information from user data by updating an existing entry in the CKD hash table.

FIG. 5 illustrates reversibly decoupling unique information from user data by updating an existing entry in the CKD hash table 99. This occurs in response to a CKD write IO for which the user data is a duplicate. In the illustrated example a host writes CKD records 0-2 to the storage array, e.g., to FE TRKs 3-5 of one of the production volumes. A coalesced CKD track 2 is generated from the CKD records 0-2. More specifically, the record meta data of CKD records 0-2 is appended to create track meta data 500 and the user data of CKD records 0-2 is appended to create track user data 502. The track user data is provided to the hash/compression engine 404, which compresses and calculates a hash of the track user data. The hash may be calculated from either the uncompressed or compressed track user data but is calculated in the same way for all operations. The hash is used as a hash key to index into the CKD hash table 99. The hash X matches existing hash key entry X in the CKD hash table, thereby indicating that the track user data is a duplicate of previously stored track user data. The track meta data 500 is provided to the compression engine 406 and the compressed track meta data, Trk 2 CMD, is stored in the matching table entry, thereby associating Trk 2 CMD with hash key X. In particular, the Trk 1 CMD and Trk 2 CMD are stored in a linked list 506. Corresponding storage array metadata 504 is also created, e.g., a TID that maps the CKD FE TRKs to the previously stored BE TRK on the managed drives, thereby deduplicating the track user data.

Figure 6:
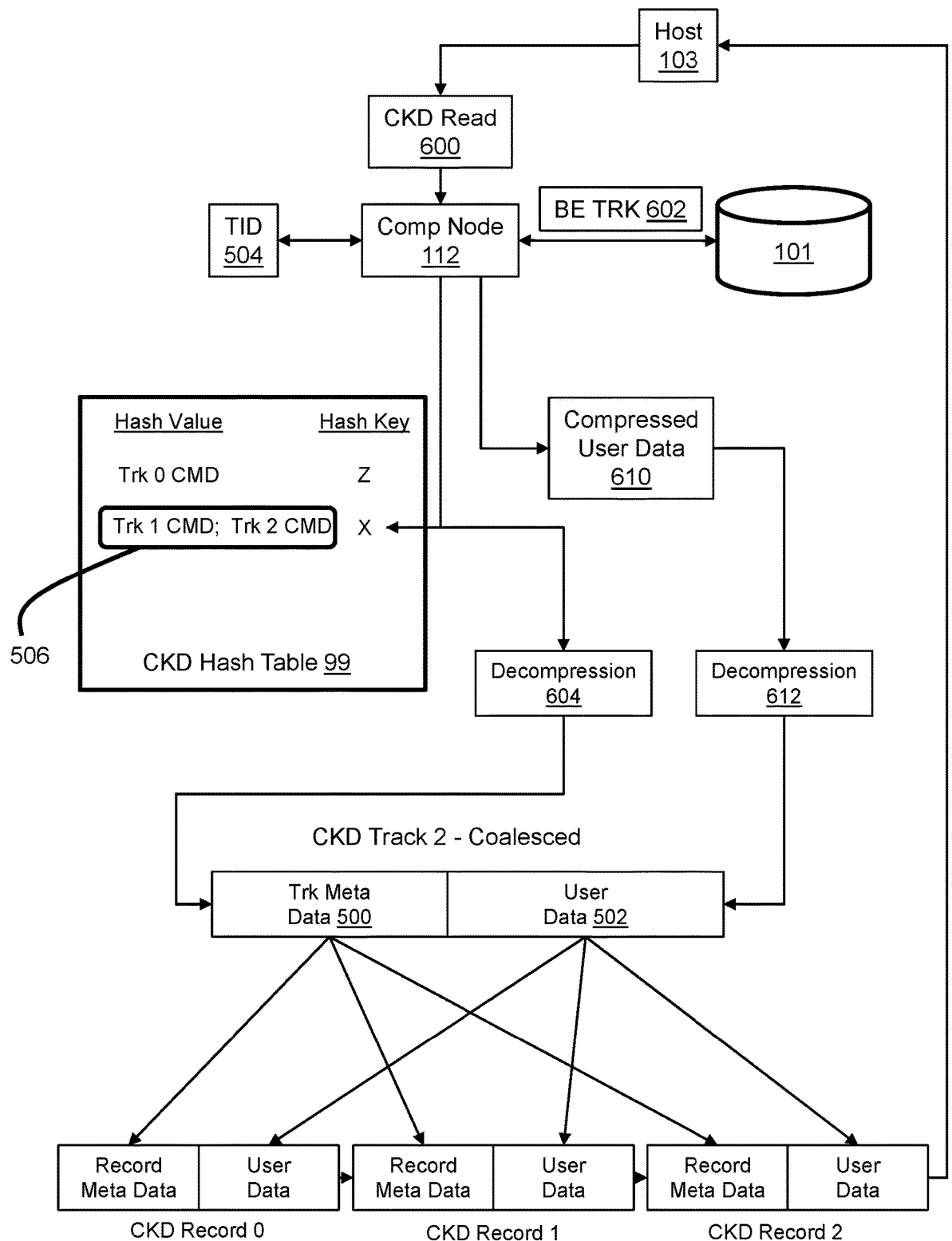
FIG. 6 illustrates reassembly of CKD records from the CKD hash table and managed drives to service a CKD read IO of duplicated user data.

FIG. 6 illustrates reassembly of CKD records 0-2 from the CKD hash table 99 and managed drives 101 to service a CKD read IO 600 from one of the hosts 103. A storage array compute node 112 uses information in the CKD read IO 600 to locate the corresponding TID 504, which is used to page-in the corresponding BE TRK 602 from the managed drives 101 to shared memory. The compressed user data 610 from the BE TRK 602 is decompressed by decompression engine 612 if the user data was stored in compressed form. The hash key X, which is retrieved with the BE TRK 602, is used to index into the CKD hash table 99 to identify the corresponding hash table entry. The cylinder and head information, which is stored in the TID 504, BE TRK 602, or both, is used to select the appropriate hash value from the linked list 506 corresponding to the CKD read, e.g., the TRK 2 CMD. The TRK 2 CMD is provided to a decompression engine 604 and decompressed. The coalesced CKD track 2 is reassembled by using the decompressed Trk 2 CMD as the track meta data 500 and the decompressed user data from the BE TRK as the track user data 502. The track meta data 500 and track user data 502 are de-coalesced to recreate the CKD records 0-2, which are provided to the host 103 to service the CKD read 600.

Figure 7:
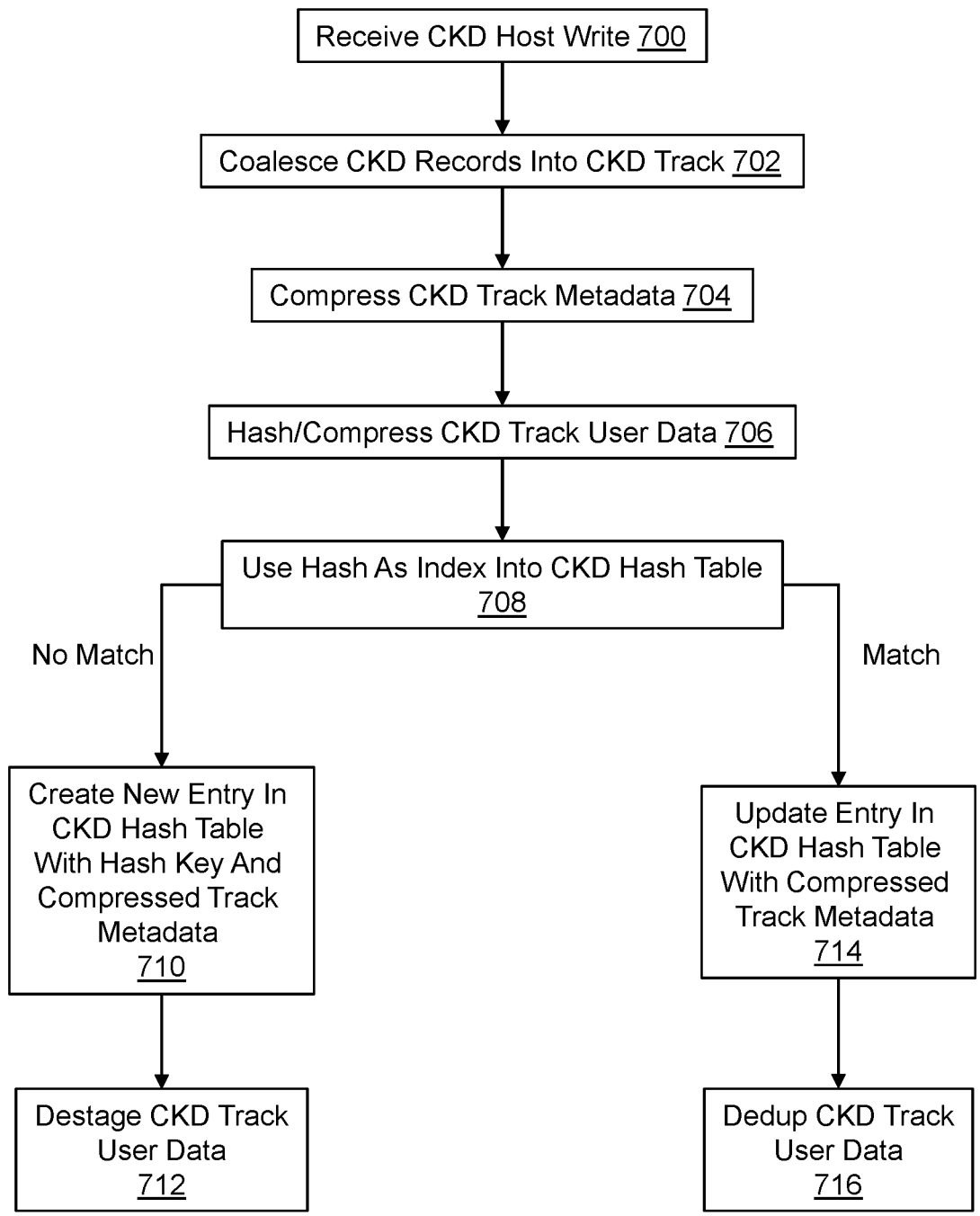
FIG. 7 illustrates a process for servicing a CKD write IO.

FIG. 7 illustrates a process for servicing a CKD write IO. In step 700 a compute node of the storage array receives a CKD write IO from a host server. Step 702 is coalescing the CKD records of the IO into a single CKD track. Step 704 is compressing the CKD track metadata (the coalesced counts and keys). Step 706 is hashing the coalesced CKD track user data. The CKD track user data may optionally be compressed and then hashed. If the uncompressed user data is hashed, then the CKD track user data may still be optionally compressed. Step 708 is using the hash as in index into the CKD hash table. In the case where there is no matching hash key entry in the table, step 710 is creating a new entry in the CKD hash table. The new entry includes the hash as a key and the compressed track meta data. Step 712 is destaging the CKD track user data to the managed drives. The CKD track user data is stored in a BE TRK in compressed or uncompressed form. In the case where there is a matching hash key entry in the table, step 714 is updating the entry with the compressed CKD track meta data. In particular, the compressed CKD track meta data is added to a linked list with the other compressed CKD track meta data of the entry. Step 716 is deduplicating the CKD track user data by creating dedup linkage, such as by storing the hash key with the user data and creating a TID with the cylinder and head.

Figure 8:
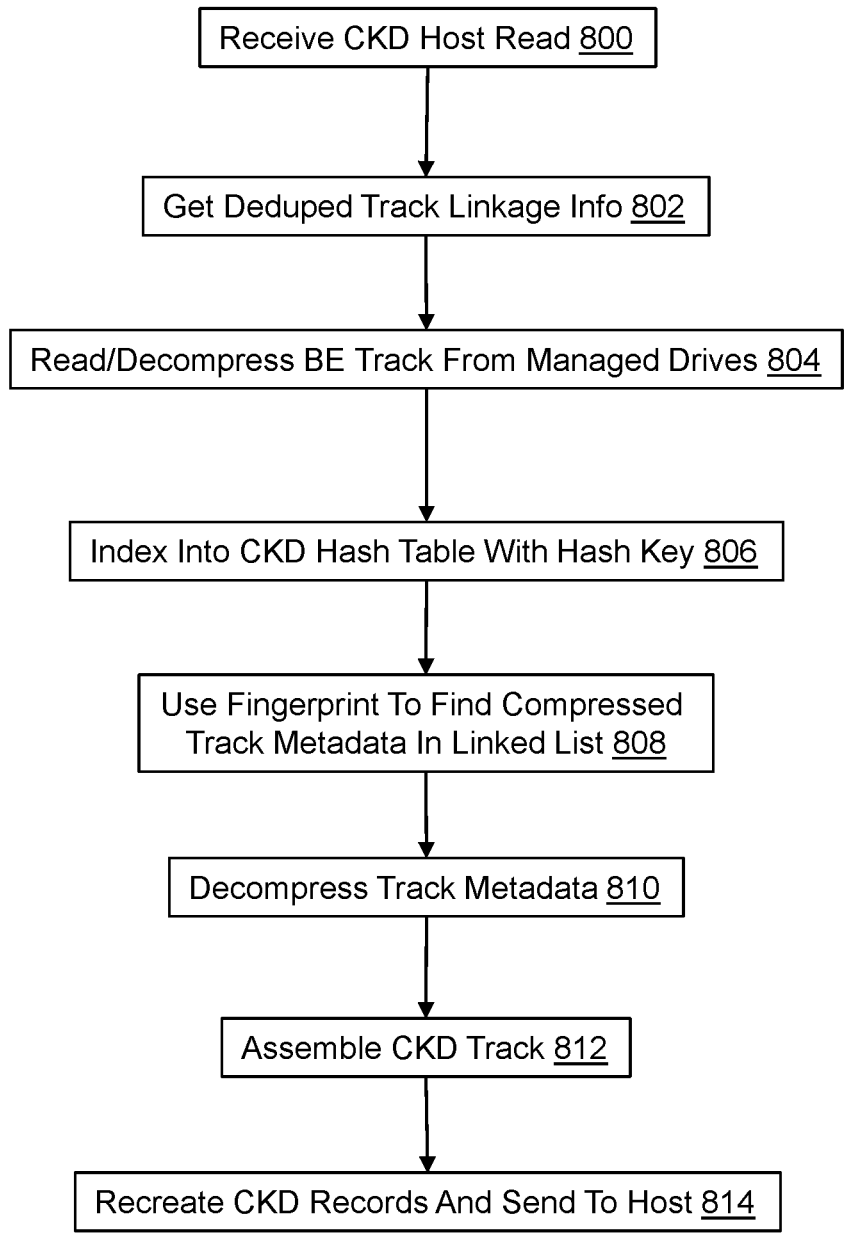
FIG. 8 illustrates a process for servicing a CKD read IO.

FIG. 8 illustrates a process for servicing a CKD read IO. In step 800 a compute node of the storage array receives a CKD read IO from a host server. Step 802 is getting the deduped track linkage information from the TIDs. The TID indicates the location of the BE TRK in shared memory and/or managed drives. The cylinder and head are also in the TID. Step 804 is reading the BE TRK from the managed drives into shared memory. If the BE TRK is stored in compressed form, then it is decompressed. In step 806 the hash key is used to index into the CKD Hash table to find the corresponding entry. Step 808 is using the cylinder and head as a fingerprint to find the corresponding compressed CKD track meta data in the linked list. The CKD track meta data is decompressed in step 810. Step 812 is using the CKD track user data and meta data to assemble the CKD track. The CKD track is used to recreate the CKD records which are sent to the host in step 814.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
 a data storage system comprising a plurality of non-volatile drives and at least one compute node configured, responsive to receipt of an input-output (IO) command to write a variable length allocation unit comprising meta data and user data, to compress the meta data and then store the meta data as compressed meta data in a first data structure comprising a hash table, store the user data in a second data structure, and deduplicate the second data structure.

2. The apparatus of claim 1 further comprising the compute node being configured to calculate a hash of the user data, use the hash as a key to determine that the hash table does not contain an existing entry for the user data, and create a new entry in the hash table by associating the hash as a key with the compressed meta data in the new entry.

3. The apparatus of claim 1 further comprising the compute node being configured to calculate a hash of the user data in compressed or uncompressed form, use the hash as a key to determine that the hash table contains an existing entry for the user data, and update the existing entry by associating the compressed meta data with the existing entry in the hash table.

4. The apparatus of claim 3 further comprising the compute node being configured to update the existing entry by adding the compressed meta data to a linked list with other compressed meta data.

5. The apparatus of claim 1 further comprising the compute node being configured to create storage system meta data that indicates a location of the user data on non-volatile storage.

6. The apparatus of claim 5 further comprising the compute node being configured to create storage system meta data that uniquely corresponds to the meta data of the IO.

7. The apparatus of claim 1 further comprising the compute node being configured to receive an IO command to read the variable length allocation unit, retrieve the meta data from the first data structure, retrieve the user data from the second data structure, and reassemble the variable length allocation unit to service the IO command to read the variable length allocation unit.

8. A method comprising:
 a compute node of a data storage system receiving an input-output (IO) command to write a variable length allocation unit comprising meta data and user data;
 compressing the meta data and then storing the meta data as compressed meta data in a first data structure comprising a hash table;
 storing the user data in a second data structure; and
 deduplicating the second data structure.

9. The method of claim 8 further comprising calculating a hash of the user data in compressed or uncompressed form, using the hash as a key to determine that the hash table does not contain an existing entry for the user data, and creating a new entry by associating the hash as a key with the compressed meta data in the new entry in the hash table.

10. The method of claim 8 further comprising calculating a hash of the user data, using the hash as a key to determine that the hash table contains an existing entry for the user data, and updating the existing entry by associating the compressed meta data with the existing entry in the hash table.

11. The method of claim 10 further comprising updating the existing entry by adding the compressed meta data to a linked list with other compressed meta data.

12. The method of claim 8 further comprising creating storage system meta data that indicates a location of the user data on non-volatile storage.

13. The method of claim 12 further comprising creating storage system meta data uniquely corresponding to the meta data of the TO.

14. The method of claim 8 further comprising the compute node receiving an IO command to read the variable length allocation unit, retrieving the meta data from the first data structure, retrieving the user data from the second data structure, and reassembling the variable length allocation unit to service the IO command to read the variable length allocation unit.

15. A non-transitory computer-readable storage medium storing instructions that when executed by a computer cause the computer to perform a method for using a computer system to store data, the method comprising:
 receiving an input-output (IO) command to write a variable length allocation unit comprising meta data and user data;
 compressing the meta data and then storing the meta data as compressed meta data in a first data structure comprising a hash table;
 storing the user data in a second data structure; and
 deduplicating the second data structure.

16. The non-transitory computer-readable storage medium of claim 15 wherein the method further comprises receiving an IO command to read the variable length allocation unit, retrieving the meta data from the first data structure, retrieving the user data from the second data structure, and reassembling the variable length allocation unit to service the IO command to read the variable length allocation unit.

* * * * *